US008256391B2

(12) United States Patent
Gelez et al.

(10) Patent No.: US 8,256,391 B2
(45) Date of Patent: Sep. 4, 2012

(54) VALVE CONTROL SYSTEM WITH MALFUNCTION DETECTION

(75) Inventors: Nicolas Gelez, Le Pecq (FR); Boris Bouchez, Saint Germain En Laye (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 548 days.

(21) Appl. No.: 12/441,675

(22) PCT Filed: Sep. 19, 2007

(86) PCT No.: PCT/FR2007/001521
§ 371 (c)(1),
(2), (4) Date: Mar. 17, 2009

(87) PCT Pub. No.: WO2008/037871
PCT Pub. Date: Apr. 3, 2008

(65) Prior Publication Data
US 2010/0018481 A1    Jan. 28, 2010

(30) Foreign Application Priority Data

Sep. 25, 2006   (FR) ...................................... 06 08374

(51) Int. Cl.
*F01L 9/04* (2006.01)

(52) U.S. Cl. ................. 123/90.11; 251/129.01; 361/152

(58) Field of Classification Search ............... 123/90.11; 251/129.01, 129.13; 361/152
See application file for complete search history.

(56) References Cited

U.S. PATENT DOCUMENTS 6,178,934 B1 *   1/2001   Hirasawa et al. .......... 123/90.11

FOREIGN PATENT DOCUMENTS

| EP | 0 915 236 A2 | 5/1999 |
| EP | 1 010 865 A | 6/2000 |
| EP | 1 577 544 A2 | 9/2005 |
| JP | 10 047028 A | 2/1998 |

OTHER PUBLICATIONS

International Search Report from PCT/FR2007/001521 dated Mar. 17, 2008 (3 pages).

* cited by examiner

*Primary Examiner* — Ching Chang
(74) *Attorney, Agent, or Firm* — Osha Liang LLP

(57) ABSTRACT

The invention relates to a valve control system for an engine including at least one cylinder (1, 2, 3, 4) with valves (5, 6), wherein said system comprises valve electromagnetic actuation members (7, 9, 10) associated with a management unit (11, 15) that controls the actuation members, said system comprising a member (11, 12, 13) for detecting a malfunction of the actuation members and a member (11, 12, 13) for electrically insulating the faulty actuation member.

5 Claims, 2 Drawing Sheets

VALVE CONTROL SYSTEM WITH MALFUNCTION DETECTION

The present invention relates to a system for controlling valves of a combustion engine such as those used to propel motor vehicles.

BACKGROUND OF THE INVENTION

A combustion engine comprises cylinders defining combustion chambers that are closed at one end by a cylinder head and at the other end by a piston which slides between top and bottom positions and which is connected to a crankshaft via a connecting rod. Ducts for admitting fuel and for exhausting the burnt gases resulting from the combustion of the fuel are created in the cylinder head and are each equipped with a valve that can move between an open position and a closed position.

The valves are conventionally operated by a camshaft the rotation of which is driven off the crankshaft.

Also known is a new valve control system comprising electromagnetic actuator elements with which each valve is equipped in order to move this valve between its open and closed positions. The control system comprises a control unit connected to the actuating elements in order to control these in accordance with the combustion engine operating cycles. At the present time, any malfunctioning of one of the actuating elements in the control system causes the control system to shut down just as any problem with the driving of the camshaft may cause the engine to stop.

SUBJECT OF THE INVENTION

One object of the invention is to provide a means that makes a control system of the aforementioned type more reliable.

SUMMARY OF THE INVENTION

To this end, the invention provides a system for controlling valves for an engine comprising at least one cylinder that has valves, the system comprising electromagnetic valve-actuating elements associated with a control unit controlling the actuating elements, the system comprising a failure detection member that detects failures of the actuating elements and an electrical isolating member for electrically isolating the defective actuating element.

Thus it becomes possible to isolate the defective actuating element and prevent the failure of this element from causing the entire control system to shut down.

According to a first embodiment for a multi-cylinder engine, said control system comprises at least two actuating elements per cylinder and an electrical isolating member common to the actuating elements of at least one cylinder.

Here, the cylinder affected by the failure or a group of cylinders of which the defective cylinder forms a part is isolated so that the engine can continue to run on the remaining cylinder or cylinders.

According to a second embodiment, each actuating element comprises an actuator comprising two electromagnets or each actuating element is formed of an electromagnet of an actuator intended to operate a valve.

Isolation then relates either to the defective electromagnet of the actuator or to the actuator comprising the defective electromagnet.

Further features and advantages of the invention will become apparent from reading the following description of some particular non-limiting embodiments of the invention.

BRIEF DESCRIPTION OF THE DRAWINGS

Reference will be made to the attached drawings, among which.

DETAILED DESCRIPTION OF THE INVENTION

Figure 1:
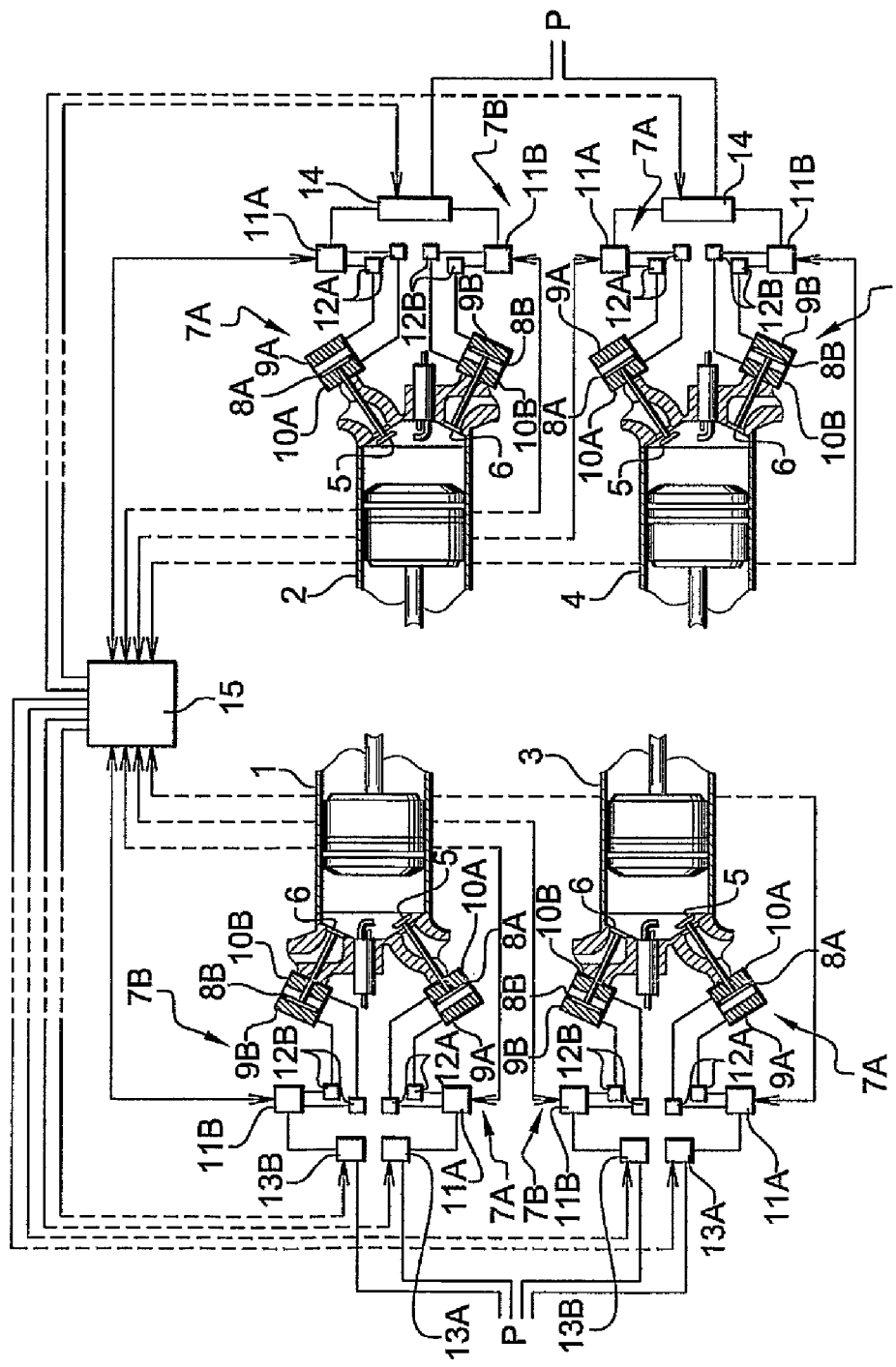
FIG. 1 is a schematic view of an engine equipped with a control system according to the invention, two embodiments being illustrated, one on the right and one on the left of this figure.

With reference to FIG. 1, the engine comprises cylinders 1, 2, 3, 4 each equipped with an inlet valve 5 and with an exhaust valve 6. Each valve 5, 6 can move between a position in which it opens and a position in which it closes the duct to which it is fitted. The figure is a schematic figure in which the position of the valves and of the pistons is entirely arbitrary and does not correspond to an engine operating cycle.

The valves 5, 6 are each associated with an actuator 7 identified by the references 7.A and 7.B in FIG. 1 respectively (in this figure, the numerical references of the components depicted have a suffix A or B according to whether they are associated with the valve 5 or the valve 6, respectively).

Each actuator 7 comprises an actuating member 8 able to move between a position in which the valve is fully closed and a position in which the valve is wide open and two electromagnets 9, 10 to attract the actuating member 8 respectively into its fully closed position and into its wide open position.

Each actuator 7 comprises an operating unit 11 to control the operation of the combustion engine in order to drive the electromagnets 9, 10. The operating unit 11, which in the way known per se comprises a digital processing module and a power module, is connected to a power network P and controls the supply of power to the electromagnets 9, 10 by controlling the current supplied to these. The operating unit 11 is connected to each electromagnet 9, 10 by a supply line on which a failure control module 12 is mounted.

Each failure control module 12 comprises a failure detection member and an isolating member to electrically isolate a defective electromagnet from the other electromagnets by cutting this defective electromagnet off from the power network P. The failure detection member is, for example, a current measuring member placed in series with the supply of power to the electromagnet in order to detect a peak current and the isolating member is, for example, a transistor driven by the current measuring member to cut off the supply of power to the electromagnet when the strength of the current exceeds a threshold value. Failure may be the result of a short-circuiting of an electromagnet.

The operating units 11 that control cylinders 1 and 3 are each connected to the network P by a failure control module 13, the operating units 11 for cylinder 2 are connected to the network P by a common failure control module 14 and the operating units 11 that control cylinder 4 are also connected to the network P by a common failure control module 14. The failure control modules 13 and 14 measure the strength of the current in the network P and incorporate a switching device to isolate the elements to which they are connected from the network P.

It will be noted that different methods of connection of the operating units 11 to the network P (modules 12, 13 and 14) have been used for the purpose of explaining different embodiments of the invention. In practice, all the cylinders will be associated with modules 13 and/or modules 14 and/or modules 12 in the same way.

The operating units 11 and the failure control modules 13 and 14 are connected to an engine control unit 15.

The control unit 15, or ECU which stands for "Engine Control Unit" sends information to the operating units 11 to allow them to drive the electromagnets 9, 10. This information includes angles of opening and of closing, a top dead center pulse, etc. The operating units 11 are programmed to transmit a certain amount of information to the control unit, such as the actual angles of opening and of closure, temperatures, etc. Furthermore, in the invention, the operating unit 11 is also designed to form a failure detection member. In particular, in the event of a failure of the sensor that senses the position of the moving member 8 it becomes no longer possible to drive the actuator 7. The operating unit 11 then forms the control unit 15 of this and the control unit will then operate the corresponding failure control module 13, 14 in order to isolate the defective actuator 7.

The failure control modules 13, 14 detect anomalies in the amount of electrical power dispensed to the actuators 7 and inform the control unit 15 of this such that the control unit can decide whether or not to electrically isolate the actuators affected by this anomaly by commanding the failure control modules 13, 14 to cut off said actuators from the network P.

The failure control modules 13, 14 may also have a structure identical to that of the failure control module 12.

Elements identical or similar to those already described will bear the same numerical reference in the following description of two alternative forms of embodiment.

Figure 2:
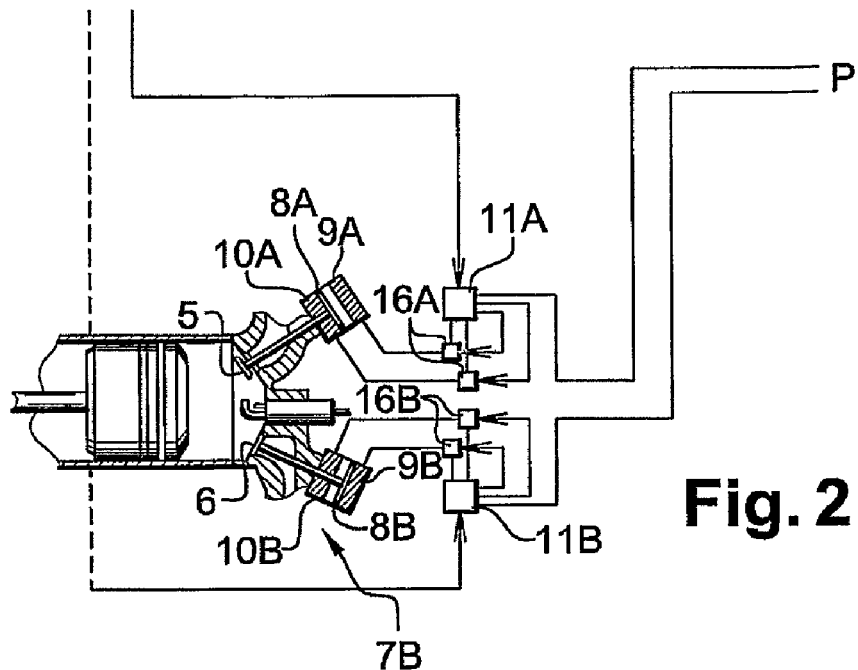
FIGS. 2 and 3 are schematic part views of an engine according to first and second embodiment variants of the invention, respectively.

In a first alternative form, as depicted in FIG. 2, the operating unit 11 is connected to each electromagnet 9, 10 by a supply line on which an isolating member 16 is mounted.

The operating unit 11 is designed to detect a failure of the electromagnets and is connected to the isolating members 16 in order to drive these in such a way as to cut off the supply of power to an electromagnet when a failure thereof is detected. Each operating unit 16 and the associated isolating members 16 form a failure control module.

Figure 3:
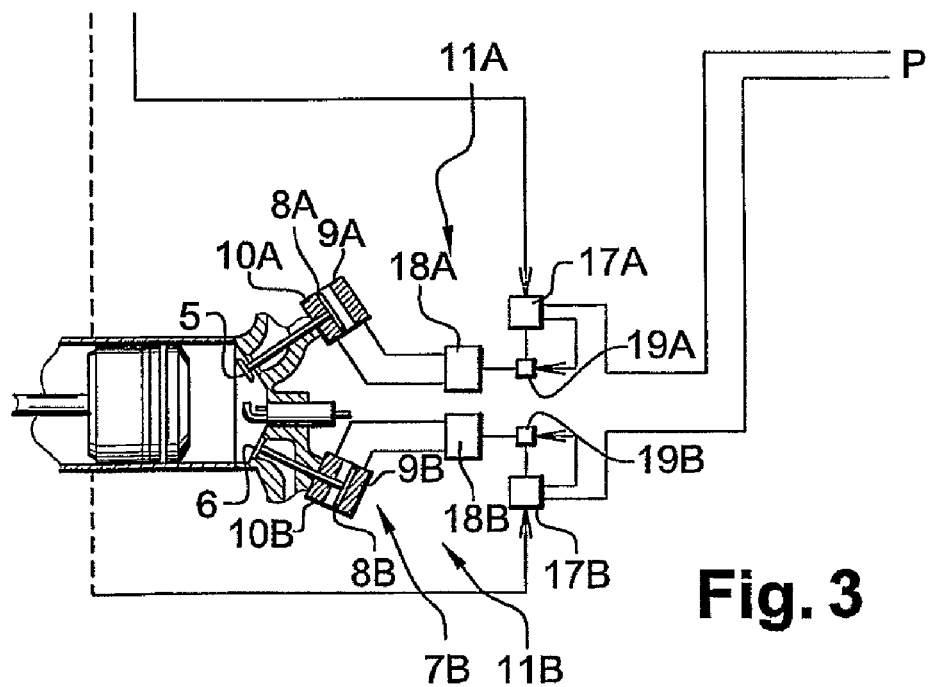

FIG. 3 depicts a second alternative form of embodiment.

Each operating unit 11 comprises a processing module 11 and a power module 18 connected to the operating module 17 by an isolating member 19 itself connected to the operating module 17. The operating module 17 is designed to drive the power module 18 and the isolating member 19 and to detect failure of the power module 18.

When a failure is detected, the processing module 17 operates the isolating member 19 in such a way as to cut the connection between the power module 18 and the network P.

It is possible also to connect the operating module 17 to that stage of the power module 18 that powers the electromagnet 9 and that stage of the power modules 19 that powers the electromagnet 10 using isolating members that can be driven individually by the processing module 17.

The isolating member or members may also be incorporated into the power module.

Of course, the invention is not restricted to the embodiment described and embodiment variants can be applied thereto without departing from the scope of the invention as defined by the claims.

As an alternative, it is possible, as desired, to choose one isolating member per actuator, one isolating member common to several actuators of one and the same cylinder, one isolating member common to all the actuators of one and the same cylinder, one actuating member common to the actuators of several cylinders, etc.

The isolating modules may have any structure that enables them to perform a circuit breaker fuse function. The isolating modules are, for example, transistors, relays, etc.

The invention claimed is:

1. A system for controlling valves for an engine comprising at least one cylinder comprising valves, the system comprising:
   electromagnetic valve-actuating elements associated with a control unit controlling the actuating elements, wherein each electromagnetic valve-actuating element is formed of an electromagnet;
   a failure detection member that detects failures of the electromagnetic valve-actuating elements; and
   an electrical isolating member for electrically isolating a defective actuating element,
   wherein the electromagnetic actuating elements are connected to the control unit via an operating unit connected to a power network, and
   wherein the failure detection member is a current measuring member placed in series with the supply of power to the electromagnet in order to detect a peak current, and wherein the isolating member is configured to perform a circuit breaker fuse function.

2. The system as claimed in claim 1, wherein for a multi-cylinder engine, the system further comprises at least two actuating elements per cylinder, and an electrical isolating member common to the at least two actuating elements of at least one cylinder.

3. The system as claimed in claim 1, wherein the operating unit forms the failure detection member and controls the isolating member.

4. The system as claimed in claim 3, wherein the operating unit comprises:
   a processing module, and a power module operatively connected to the processing module via the isolating member.

5. The system as claimed in claim 1, wherein each of the electromagnetic valve-actuating elements comprises an actuator that comprises two electromagnets.

* * * * *